(12) United States Patent
Nonogi et al.

(10) Patent No.: US 8,469,145 B2
(45) Date of Patent: Jun. 25, 2013

(54) MULTILAYER SOUND ABSORBING SHEET

(75) Inventors: Mari Nonogi, Sagamihara (JP); Makoto Sasaki, Mishima (JP); Chiaki Hanamaki, Sagamihara (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 12/937,673

(22) PCT Filed: Apr. 10, 2009

(86) PCT No.: PCT/US2009/040192
§ 371 (c)(1),
(2), (4) Date: Jan. 3, 2011

(87) PCT Pub. No.: WO2009/129139
PCT Pub. Date: Oct. 22, 2009

(65) Prior Publication Data
US 2011/0100748 A1    May 5, 2011

Related U.S. Application Data

(60) Provisional application No. 61/044,538, filed on Apr. 14, 2008.

(51) Int. Cl.
*E04B 1/84*    (2006.01)

(52) U.S. Cl.
USPC .......................................................... 181/291

(58) Field of Classification Search
USPC .................................. 181/286, 290, 291, 293
See application file for complete search history.

(56) References Cited

U.S. PATENT DOCUMENTS

| 3,177,970 | A | * | 4/1965 | Boschi | 181/290 |
| 3,214,565 | A | * | 10/1965 | Hager, Jr. et al. | 392/435 |
| 4,559,255 | A | | 12/1985 | Shimode et al. | |
| 5,192,624 | A | | 3/1993 | Morimoto | |
| 5,545,861 | A | | 8/1996 | Morimoto | |
| 5,700,527 | A | | 12/1997 | Fuchs et al. | |
| 6,345,688 | B1 | * | 2/2002 | Veen et al. | 181/290 |
| 6,555,246 | B1 | | 4/2003 | Zwick | |
| 6,598,701 | B1 | | 7/2003 | Wood et al. | |
| 6,601,673 | B2 | | 8/2003 | Murakami et al. | |
| 6,617,002 | B2 | | 9/2003 | Wood | |
| 6,720,069 | B1 | | 4/2004 | Murakami et al. | |
| 6,769,512 | B2 | * | 8/2004 | Bargo | 181/290 |

(Continued)

FOREIGN PATENT DOCUMENTS

| EP | 0023618 | 2/1981 |
| EP | 0816583 | 7/1998 |

(Continued)

OTHER PUBLICATIONS

International Search Report for PCT/US2009/040192, mailed Oct. 22, 2009.

(Continued)

*Primary Examiner* — Jeremy Luks

(57) ABSTRACT

A multilayer sound absorbing sheet including a film layer having through-micro bores and apertures, and a fibrous material layer disposed on the film layer is provided. A method of absorbing sound including providing the multilayer sound absorbing sheet of the present disclosure and positioning the multilayer sound absorbing sheet between an acoustic source and a sound-reflecting surface is also provided.

21 Claims, 4 Drawing Sheets

U.S. PATENT DOCUMENTS

| | | | |
|---|---|---|---|
| 6,820,720 | B1 | 11/2004 | Nicolai et al. |
| 6,983,822 | B2 | 1/2006 | O'Regan et al. |
| 6,997,109 | B2 | 2/2006 | Saito |
| 7,279,214 | B2 | 10/2007 | Nicolai et al. |
| 2006/0096183 | A1 | 5/2006 | Yamaguchi et al. |
| 2006/0124387 | A1* | 6/2006 | Berbner et al. ............... 181/290 |
| 2007/0122568 | A1 | 5/2007 | Blömeling |
| 2007/0227815 | A1* | 10/2007 | Nakamura .................... 181/290 |
| 2007/0272482 | A1* | 11/2007 | Yamaguchi et al. .......... 181/290 |
| 2011/0100749 | A1 | 5/2011 | Nonogi et al. |
| 2011/0180348 | A1 | 7/2011 | Nonogi et al. |

FOREIGN PATENT DOCUMENTS

| | | |
|---|---|---|
| EP | 1775714 | 4/2007 |
| JP | 4037994 | 7/1985 |
| JP | 03-023319 | 1/1991 |
| JP | 3108400 | 5/1991 |
| JP | 04-186397 A | 7/1992 |
| JP | 6-4398 | 2/1994 |
| JP | 60083365 | 3/1994 |
| JP | 7213418 | 8/1995 |
| JP | 08042015 | 2/1996 |
| JP | 8042015 A | 2/1996 |
| JP | 9013943 | 1/1997 |
| JP | 9217955 | 8/1997 |
| JP | 10088689 | 4/1998 |
| JP | 11-062047 A | 3/1999 |
| JP | 2000-020070 A | 1/2000 |
| JP | 2000-144968 | 5/2000 |
| JP | 2001-132132 | 5/2001 |
| JP | 2002-057488 | 2/2002 |
| JP | 2004-353294 A | 12/2004 |
| JP | 2005-121994 A | 5/2005 |
| JP | 2005-283703 | 10/2005 |
| JP | 2006-153926 A | 6/2006 |
| JP | 2006-323204 | 11/2006 |
| JP | 2007-127908 A | 5/2007 |
| KR | 10-2006-0056384 | 5/2006 |
| WO | WO 2006/021605 | 3/2006 |
| WO | WO 2007/137607 | 12/2007 |

OTHER PUBLICATIONS

International Search Report for PCT/US2009/042937, mailed Dec. 2, 2009.

International Search Report for PCT/US2009/040209, mailed Nov. 24, 2009.

* cited by examiner

MULTILAYER SOUND ABSORBING SHEET

CROSS REFERENCE TO RELATED APPLICATIONS

This application is a national stage filing under 35 U.S.C. 371 of PCT/US2009/040192, filed Apr. 10, 2009, which claims priority to U.S. Provisional Application No. 61/044,538 filed Apr. 14, 2008, the disclosures of which are incorporated by reference in their entirety herein.

FIELD OF THE DISCLOSURE

The present disclosure generally relates to a multilayer sound absorbing sheet that includes a film layer and a fibrous material layer disposed on the film layer. Further the present disclosure generally relates to a method of absorbing sound including providing the multilayer sound absorbing sheet and positioning the multilayer sound absorbing sheet between an acoustic source and a sound-reflecting surface.

BACKGROUND

Various kinds of sound absorbers are used in a number of different disciplines for absorbing sound. Known sound absorbers include open-cell materials such as glass wool, rock wool, sponge, felt or urethane form; porous materials such as porous sintered board, metallic fiber board or foam metal board; open-cell chalk board; a combination of sheet material and nonwoven sound absorbers; or certain films.

Glass wool or felt has been used for absorbing sounds from engine compartments of automobiles. In this case, the sound absorbing coefficient may increase in proportion to the thickness of the sound absorber. The weight and cost of the sound absorber is larger as the thickness is increased.

A variety of sound absorbers are used for electric and electronic equipment. With the continuing emphasis on size reduction and cost reduction of such equipment, thin and flexible sound absorbers are desirable.

A variety of nonwoven sound absorbers have found use. But, the capability of some nonwoven fabrics is relatively low at low frequencies such as 3000 Hz or lower, and tends to be higher at higher frequencies. The sound absorption at low frequencies may be improved if the absorber is thicker. However, the sound absorbing capability at high frequencies may decrease.

It is known that the sound absorbing capability at low frequencies can sometimes be improved by using a combination of a porous material and a film. In this case, the sound absorber can be relatively thin, but a minimum amount of backing airspace (e.g. about 10 mm) may be necessary for best low frequency performance. In addition, the sound absorbing ability at high frequencies may be low.

It is desirable to provide sound absorbers or methods of absorbing sound which are capable of absorbing sounds in wide range of frequency, thin (even including a backing airspace), and have flexibility.

SUMMARY

The present invention provides in one aspect a multilayer sound absorbing sheet which includes a film layer having both through-micro bores and apertures, and a fibrous material disposed on the film layer. Another aspect of the present invention provides a method of absorbing sound which includes providing the multilayer sound absorbing sheet and positioning the multilayer sound absorbing sheet between an acoustic source and a sound-reflecting surface.

Thus, herein is disclosed in one aspect a multilayer sound absorbing sheet comprising: a film layer comprising through-micro bores and apertures comprising a diameter of at least 1 mm, and a fibrous material layer disposed on the film layer.

Herein is also disclosed a method of absorbing sound comprising the steps of: providing a multilayer sound absorbing sheet comprising a film layer comprising through-micro bores and apertures comprising a diameter of at least 1 mm, and a fibrous material layer disposed on the film layer; and, positioning the multilayer sound absorbing sheet between an acoustic source and a sound-reflecting surface, with a backing airspace between the multilayer sound absorbing sheet and the sound-reflecting surface.

Herein is also disclosed a sound absorber, comprising: a sound-reflecting surface and a multilayer sound absorbing sheet comprising a film layer comprising through-micro bores and apertures comprising a diameter of at least 1 mm, and a fibrous material layer disposed on the film layer, disposed near the sound-reflecting surface with a backing airspace between the multilayer sound absorbing sheet and the sound-reflecting surface.

The above summary of the present invention is not intended to describe each illustrated embodiment or every implementation of the present invention. The Figures and the detailed description which follow more particularly exemplify these embodiments.

Figure 1:
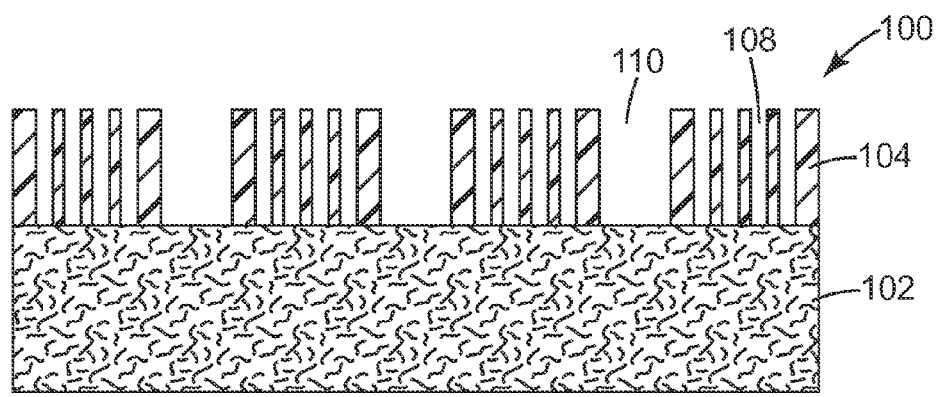
FIG. 1 is a cross-sectional view of one embodiment of the multilayer sound absorbing sheet of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The film layer of the present disclosure may include a single layer, double layers or more layers. The multilayer sound absorbing sheet, in accordance with one embodiment, may include double layers of films having different elastic modulus. Further, the multilayer sound absorbing sheet, in one embodiment, may be relatively thin (for example, having a thickness of about 510 μm to about 2500 μm). Such multilayer sound absorbing sheets can allow the use of a backing airspace that is relatively thin (for example, about 1 mm to about 20 mm, about 1 mm to about 10 mm or about 1 mm to about 5 mm).

The method of absorbing sound of the present disclosure includes providing the multilayer sound absorbing sheet of the present disclosure. The method also includes providing the multilayer sound absorbing sheet between an acoustic source and a sound-reflecting surface. The sound reflecting surface may include, but is not limited to, internal surfaces of electric and electronic equipment such as computers, audio instruments, copiers, washing machines or air conditioners; or internal surfaces of automobiles. The distance between the multilayer sound absorbing sheet and the sound-reflecting surface (i.e., the thickness of the backing airspace) can be relatively small (for example, about 1 mm to about 20 mm, about 1 mm to about 10 mm or about 1 mm to about 5 mm).

The multilayer sound absorbing sheets and the method of absorbing sound may provide effective sound absorption in various frequencies.

FIG. 1 is a cross-sectional view of one embodiment of the multilayer sound absorbing sheet of the present disclosure. The multilayer sound absorbing sheet 100 includes a film layer 104 and a fibrous material layer 102. In one embodiment, film layer 104 includes a single film layer which includes through-micro bores 108 collectively having an air permeability of about 0.1 seconds per 100 cc to about 300 seconds per 100 cc (in the absence of apertures, and as measured in accordance with JIS-L-1906). In one embodiment, the through-micro bores comprise a diameter range of about 10 μm to about 200 μm. In various embodiments, the through-microbores are present at a density of from about 77,500 holes/m$^2$ to about 6,100,000 holes/m$^2$, or from about 620,000 holes/m$^2$ to about 1,240,000 holes/m$^2$. Further, film layer 104 also includes apertures 110 having a diameter of at least about 1 mm. In various embodiments, the apertures can have a maximum diameter of about 25 mm, about 10 mm, about 5 mm, or about 2 mm. In certain embodiments, the apertures can comprise a larger diameter (e.g., up to 100 mm), if the aperture spacing is such that a suitable aperture ratio is maintained. In various embodiments, the film layer can have an aperture ratio of about 3% to about 50%, or about 10% to about 40%.

As used herein, the term "through-micro bores" represents micro holes passing completely through the film layer, the term "apertures" represents holes passing completely through the film layer and larger than the through-micro bores, and the term "aperture ratio" represents a percentage of aperture area in unit area of the film layer. The through microbores, and/or the apertures, may be circular or noncircular (as explained in further detail later herein), and may be regular or irregular. In the case of noncircular or irregularly shaped microbores or apertures, the term "diameter" refers to the diameter of a circular opening having the same area as the opening of the non-circular shaped micro-bore or aperture. The microbores and/or apertures may also vary in size. In such a case, the diameter refers to the average diameter of the total population of microbores or apertures.

By having the combination of the through-microbores and the apertures, the sound absorbing effect of the multilayer sound absorbing sheet of the present disclosure can be improved (for example, in comparison to a fibrous layer with an unperforated film), especially at relatively high-frequencies. While not wishing to be limited by theory or mechanism, the multilayer sound absorbing sheets disclosed herein may absorb sound, for example, by membrane oscillation of the film layer, by friction of air in the through-micro bores, by friction of air in the fibrous layer, or by a combination of these mechanisms.

The film layer can include, but is not limited to, a resin film having flexibility. Exemplary polymeric materials that can be used for the resin film include, but are not limited to, polyesters such as polyethylene terephthalate (PET), polybutylene terephthalate (PBT) or polyethylene naphthalate (PEN); polycarbonate; polyolefins such as polyethylene, polypropylene or polybutylene; polyvinyl resins such as polyvinyl chloride, polyvinylidene chloride or polyvinyl acetals; cellulose ester resins such as cellulose triacetate or cellulose acetate. In various embodiments, the thickness of the film layer is about 10 μm to about 500 μm or is about 10 μm to about 250 μm. In one embodiment, the weight per square meter of the film layer is from about 5 grams to about 500 grams.

The fibrous material layer 102 can comprise, but is not limited to, woven fabric, nonwoven fabric, foams such as polyurethane foam or cellulose foam, or felt. The nonwoven fabric may be made by known melt blown methods. In one embodiment, the thickness of fibrous material layer 102 is about 500 μm to about 2000 μm. In one embodiment, nonwoven layers of this thickness range can be formed by taking an existing nonwoven layer of, for example, 3-4 mm in thickness, and compressing or densifying the nonwoven to the desired thickness range.

The total thickness of the multilayer sound absorbing sheet of FIG. 1 may be relatively thin, for example, about 510 μm to about 2500 μm.

To generate a sound absorbing effect, the multilayer sound absorbing sheet can be placed at or near a sound-reflecting surface. In one embodiment, the film layer is placed facing the acoustic source (e.g., the incoming airborne sound). Further, the multilayer sound absorbing sheet may have a backing air space (gap) between the fibrous material layer 102 and the sound-reflecting surface. The multilayer sound absorbing sheet of the present disclosure may exhibit a good sound absorbing effect even if the backing air space is relatively thin (such as, for example, about 1 mm to about 20 mm, about 1 mm to about 10 mm or about 1 mm to about 5 mm).

The film layer comprising through-micro bores may be prepared by any known method. For example, a resin film can be micro-perforated by needle punching with a roll having needles to form through-micro bores, with a separate operation (e.g., mechanical punching) then used to form apertures. Various shapes of the through-micro bores or apertures may be used. Exemplary shapes of apertures include, but are not limited to, round, oval, triangle, square, rectangle, polygon or star. The round, oval or rounded off shape may be preferable. The obtained film layer 104 having both through-micro bores and apertures, and fibrous material layer 102, may be laminated together by known lamination methods such as adhesion, stapling or stitching, to form multilayer sound absorbing sheet 100. For the adhesion, an adhesive, a hot melt adhesive, a bond or a bonding tape may be used. Or, the fibrous material and the film layer can be heat-laminated to each other. The resulting multilayer sheet product can be stored in a roll.

Figure 2:
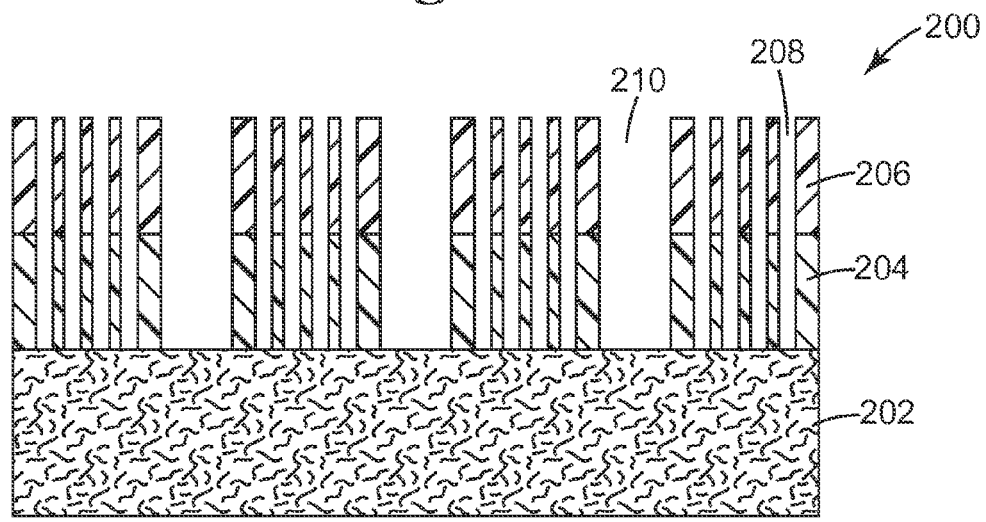
FIG. 2 is a cross-sectional view of another embodiment of the multilayer sound absorbing sheet of the present disclosure.

FIG. 2 is a cross-sectional view of another embodiment of the multilayer sound absorbing sheet of the present disclosure. In this embodiment, multilayer sound absorbing sheet 200 includes a fibrous material layer 202, a first film layer 204 (which contacts fibrous material layer 202), and a second film layer 206 (which faces the acoustic source). In this embodiment, the first and second film layers 204 and 206 may have a different elastic modulus from each other or the same elastic modulus. The elastic modulus of the first film layer 204 includes, but is not limited to, about 5 MPa to about 3000 Mpa, or about 1000 MPa to about 3000 MPa. The elastic modulus of the second film layer 206 includes, but is not limited to, about 5 MPa to about 3000 MPa. The first film layer includes a thickness of about 10 µm to about 250 µm, and the second layer includes a thickness of about 10 µm to about 250 µm. The thickness of the second layer may be the same as the first layer or different from the first layer. The first and the second layers 204 and 206 have through-micro bores and apertures. The air permeability of the through-micro bores and aperture ratio of the apertures may be the same as noted above. The weight per square meter of the first and second film layers may be the same as noted above.

The double film layer can be prepared by any known method such as, for example, laminating the first and second film layers by heat lamination, dry lamination or adhesion. When the layers are laminated by adhesion, in one embodiment a suitable adhesive may be partially applied to the surface of the first or second film layer. To apply the adhesive partially, for example, the adhesive may be applied in discrete locations, dotted, applied by spray, etc. Such partial application of the adhesive over the film layer area can result in having air present between the laminated film layers. This may lead to membrane oscillation of one or both layers which may improve the sound absorption of the multilayer sheet. In an alternative embodiment, the double film layer can be prepared by extrusion. For example, a molten resin of the second film material may be extruded onto the first film layer by known extrusion methods.

After laminating the first and second film layers together, the double film layer may be micro-perforated to provide through-micro bores, and perforated to form apertures, by the methods mentioned above. Then, the double film layer having through-micro bores and apertures can be laminated to a fibrous material layer 202 by known methods such as those mentioned above. The obtained sheet can be stored in roll.

The total thickness of the multilayer sound absorbing sheet of FIG. 2 (comprising a multilayer film) may be relatively thin such as about 520 µm to about 2500 µm, or about 900 µm to about 2000 µm.

Figure 3:
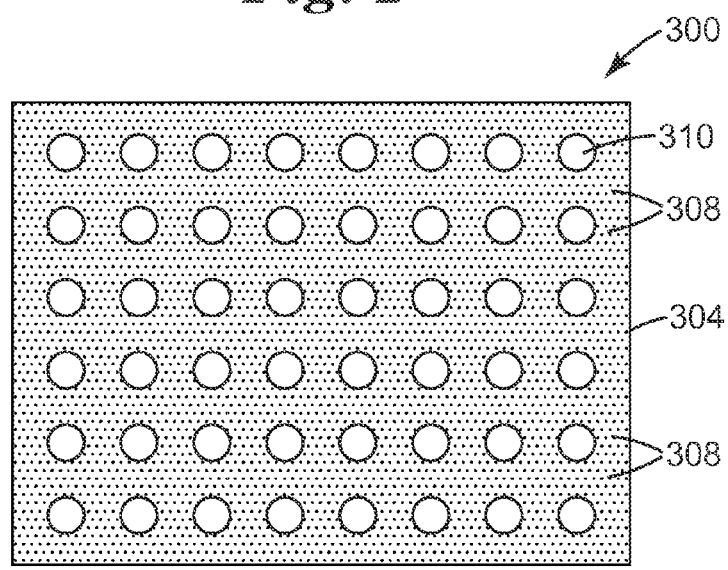
FIG. 3 is an elevational view of one embodiment of the film layer of the present disclosure.

FIG. 3 is an elevational view of one embodiment of a film layer of the present disclosure. The film layer 300 includes a film layer 304 which has both through-micro bores 308 and apertures 310. The through-micro bores can be applied so as to provide air permeability of from about 0.1 seconds per 100 cc to about 300 seconds per 100 cc. A diameter of apertures and aperture ratio may be the same as mentioned above.

Figure 4:
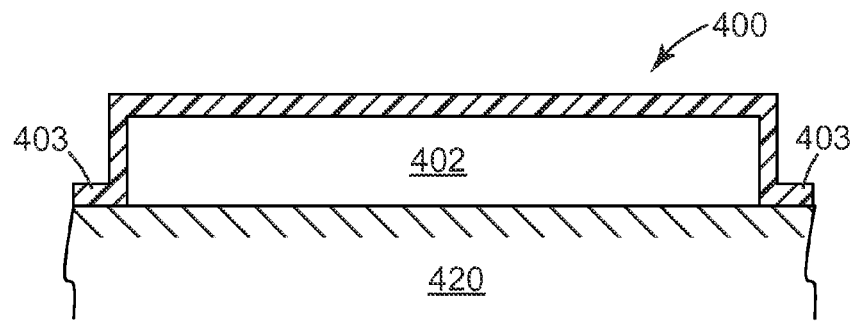
FIG. 4 is a cross-sectional view of another embodiment of the multilayer sound absorbing sheet of the present disclosure.

FIG. 4 is a cross-sectional view of another embodiment of the multilayer sound absorbing sheet of the present disclosure. The multilayer sound absorbing sheet 400 may be cut and formed in a shape such as shown in FIG. 4. Sheet 400 may have flanges 403 that allow the sheet to be attached to surface 420 such that a portion of sheet 400 does not contact surface 420 (that is, so that a backing airspace 402 is present). The sheet may be positioned against sound-reflective surface 420 such that the fibrous material layer of the sheet is inside (facing surface 420), and the film layer is on the outside (e.g., facing the incoming sound). In this shape, backing airspace 402 may be made between the multilayer sound absorbing sheet 400 and a surface 420. The distance between the portion of multilayer acoustic absorbing sheet 400 that is spaced apart from surface 420, and surface 420, may be, but is not limited to, for example, about 1 mm to about 20 mm, about 1 mm to about 10 mm or about 1 mm to about 5 mm. The multilayer sound absorption sheet of the present disclosure is relatively thin and flexible, so it may be formed in various shapes, not limited to the shape denoted in FIG. 4. For example, sheet 400 can be formed to match the shape of a particular surface 420.

Figure 5:
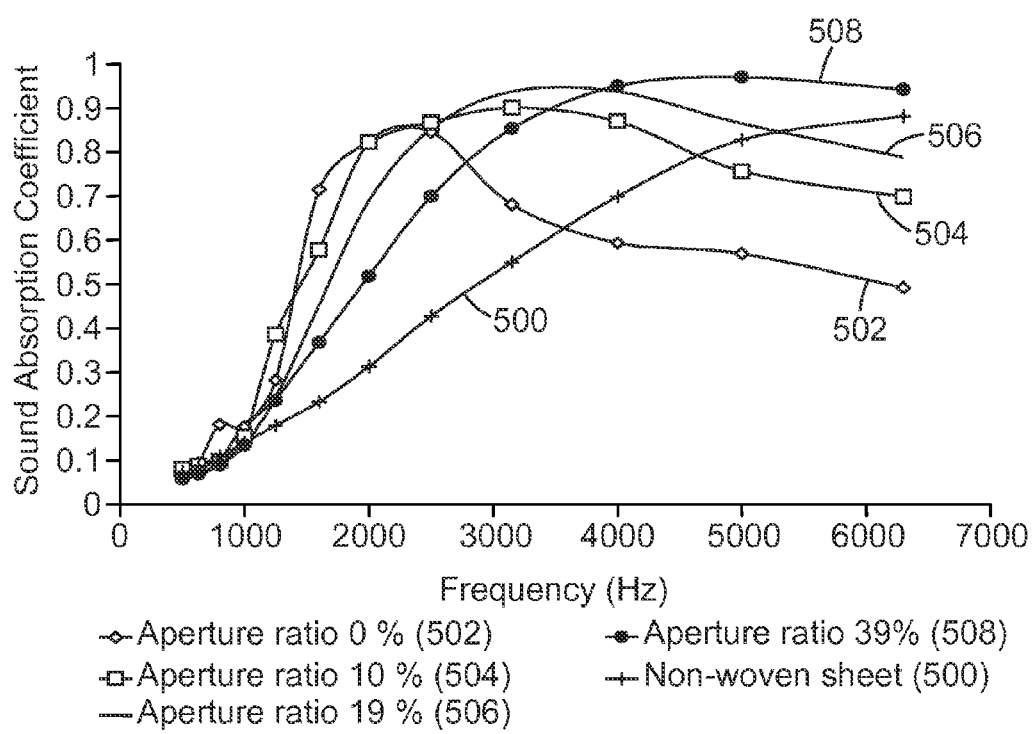
FIG. 5 is a graph of sound absorption of multilayer sound absorbing sheets with various aperture ratios.

FIG. 5 is a graph illustrating the relation between aperture ratio and sound absorption coefficient. (For comparison, spectrum 500 shows the sound absorption coefficient for a nonwoven sheet of about 10 mm thickness. In this and in other examples, the 10 mm nonwoven sheet comprised a melt-blown polypropylene web of about 200 grams/m² density, with a spun-bonded scrim). The spectrums 502, 504, 506 and 508 show the sound absorption coefficient of a multilayer sound absorbing sheet including a nonwoven fabric having a thickness of about 0.9 mm and a weight per square meter of about 84 grams (a melt-blown nonwoven sheet having a thickness of about 3 mm to about 4 mm can be pressed to furnish such a nonwoven sheet), a polyethylene terephthalate (PET) film having a thickness of 38 µm and a polyethylene (PE) film having a thickness of 10 µm. The elastic modulus of the PET film was about 2700 Mpa, and that of the PE film was about 6 Mpa. The PE resin was extruded and solidified to form the PE film on the PET film, then the laminated PE-PET layer was micro-perforated and perforated. The laminated double film layers had through-micro bores having a diameter of about 100 µm and a density of about 1,240,000 holes/m² and apertures having a diameter of about 4.5 mm, with the aperture ratio as noted in FIG. 5. A backing airspace (gap) of 10 mm was used for each spectrum. All sound-absorption spectrums (in this and all other examples) were generated in accordance with ASTM E 1050, using well-known impedance tube testing. For multilayer sound absorbing sheet samples, the sample was positioned in the impedance tube by spanning a 29 mm diameter section of the sample across the opening of the impedance tube, with the edges of the sample adhered to the flange of the impedance tube opening using double-sided adhesive, so that the sheet was disposed normal to the incident sound (typically, in these experiments, the sound absorbing sheet was positioned so that the acoustic source faced the film layer of the multilayer sheet). The reflective surface of the impedance tube (behind the sample from the acoustic source) was adjusted to provide the desired backing airgap. For the nonwoven samples, the nonwoven was placed directly against the reflective surface of the impedance tube with no airgap.

Figure 6:
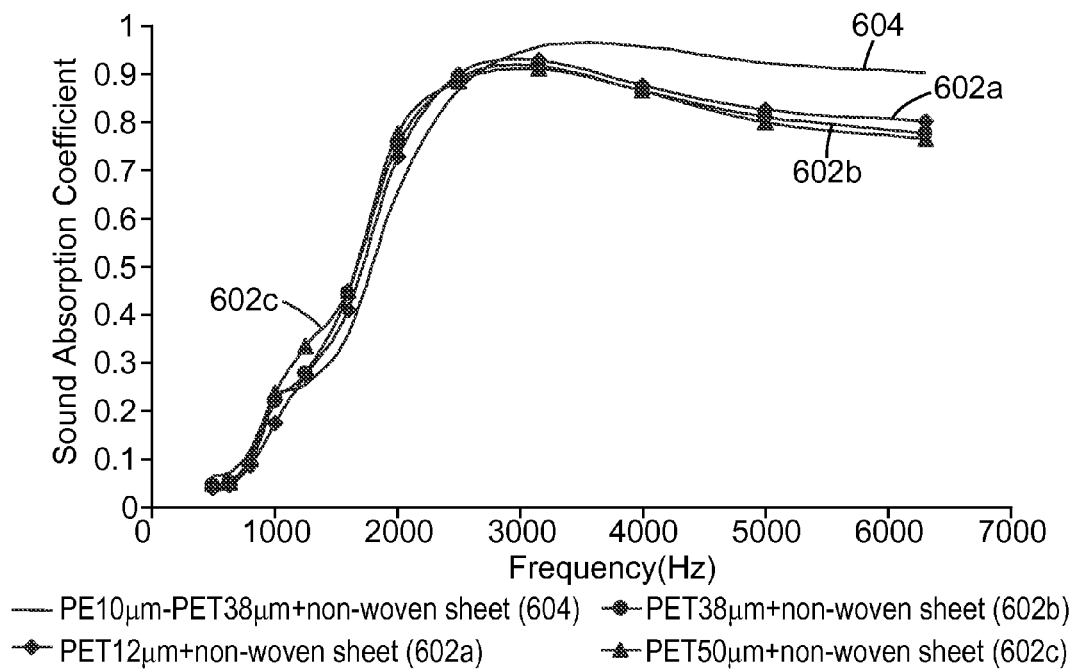
FIG. 6 is a graph of sound absorption of a multilayer sound absorbing sheet with a single film layer, and a multilayer sound absorbing sheet with a double film layer.

FIG. 6 is a graph illustrating the sound absorption coefficient of a multilayer sound absorbing sheet including a single film layer, and a sound absorbing sheet including a double film layer. FIG. 6 depicts sound absorption coefficient spectrums 602a-c and 604. The spectrums 602a-c shows a sound absorption coefficient for the multilayer sound absorbing sheet including a nonwoven fabric having a thickness of about 0.9 mm (the 0.9 mm nonwoven web of FIG. 5), and a PET film having through-micro bores and apertures. The thickness of the PET film was 12 µm for 602a, 38 µm for 602b and 50 µm for 602c.

The spectrum 604 shows a sound absorption coefficient for the multilayer sound absorbing sheet including a nonwoven fabric having a thickness of about 0.9 mm, a PET film having a thickness of 38 µm and a polyethylene (PE) film having a thickness of 10 µm. The elastic modulus of the PET film was about 2700 Mpa, and that of the PE film was about 6 Mpa. The PE film and the PET film were formed by extruding PE resin onto the PET film and solidifying it to form a multilayer film structure. The multilayer film structure was then processed by methods described above to provide through-micro bores having an average diameter of about 100 µm and a density of about 1,240,000 holes/m², and apertures having a diameter of about 4.5 mm and an aperture ratio of 22.7%.

The spectrums 602*a-c* and 604 were generated in the same manner as those described with reference to FIG. 5.

Figure 7:
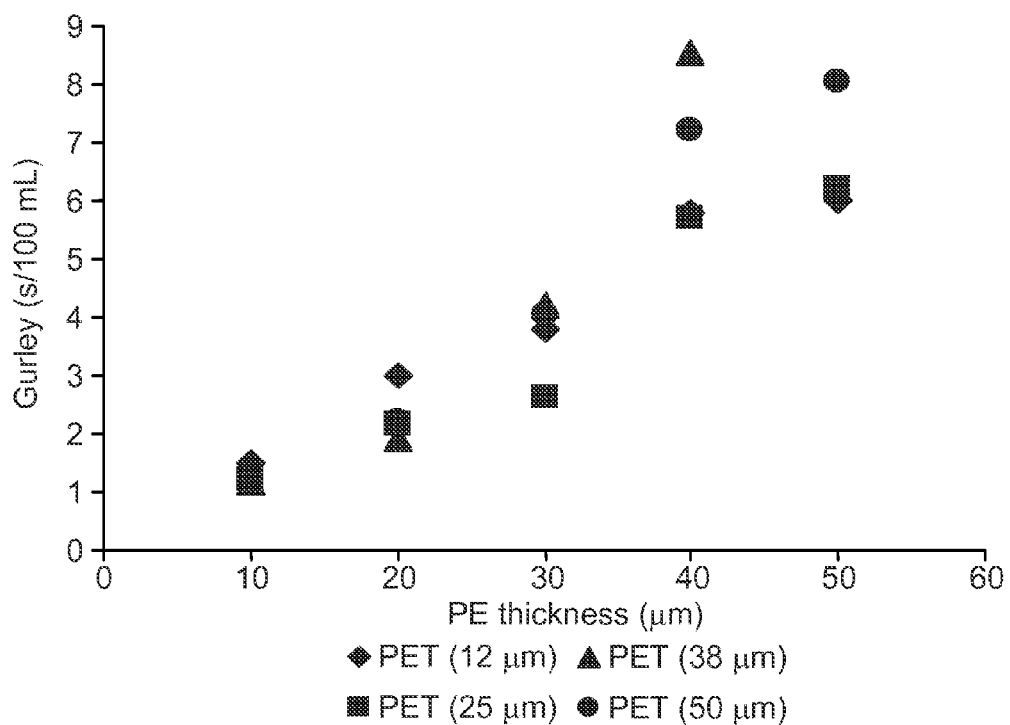
FIG. 7 is a graph Gurley air-permeability of various films having through-microbores.

FIG. 7 is a graph illustrating the relation between film thickness and air permeability. Film layers having about 1,240,000 holes/m² of through-micro bores (and not having apertures) were characterized in accordance with JIS-L-1906, with the air permeability value shown in FIG. 7 in accordance with the Gurley method. The air permeability value in the Gurley method shows the time it takes 100 cc of air to pass through a film (seconds per 100 cc). Various film layers were measured, including a PET film having a variety of thickness of 12 μm, 25 μm, 38 μm and 50 μm, and a PE film having a variety of thickness of 10 μm, 20 μm, 30 μm, 40 μm and 50 μm. Preferred air permeability value may be from about 0.1 seconds per 100 cc to about 300 seconds per 100 cc. To obtain this range of air permeability, a variety of sizes and densities of through-micro bores can be used. Exemplary size and density of through-micro bores includes, but are not limited to, for example, a diameter range of about 10 μm to 200 μm and a density of from about 620,000 holes/m² to about 1,240,000 holes/m².

Figure 8:
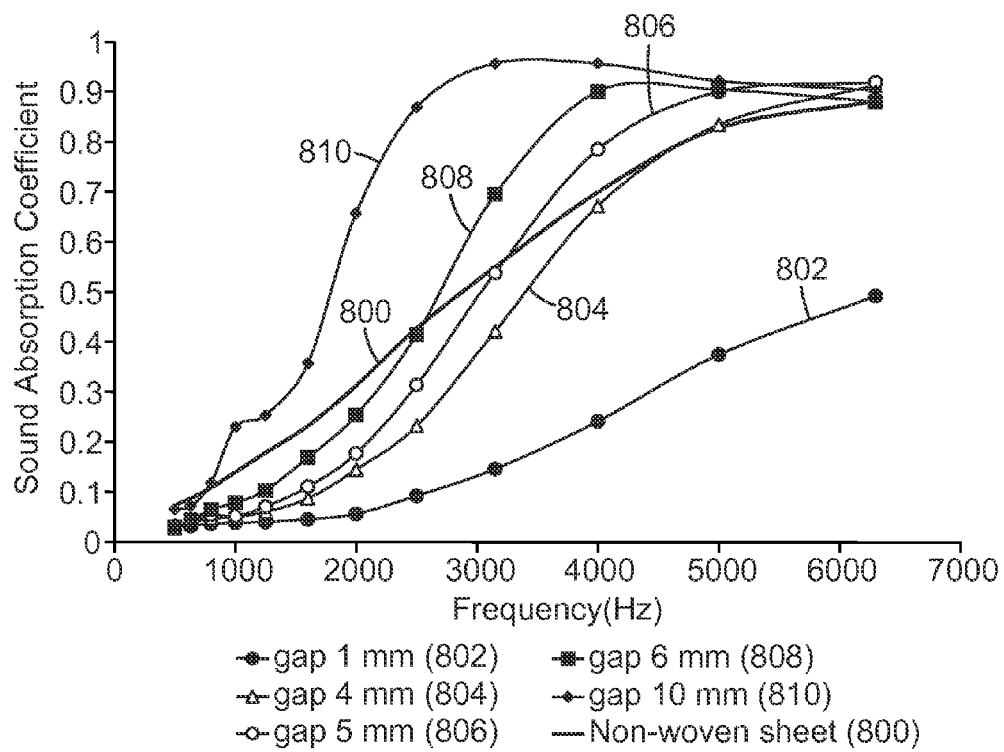
FIG. 8 is a graph of sound absorption of a multilayer sound absorbing sheet with various backing airspace thicknesses.

FIG. 8 is a graph illustrating the relation between the sound absorbing property and the backing airspace (gap). The spectrum 800 shows a sound absorption coefficient for a melt-blown nonwoven sheet having 10 mm of thickness. The spectrums 802, 804, 806, 808 and 810 show a sound absorption coefficient for a multilayer sound absorbing sheet of the present disclosure which includes 38 μm thickness of PET film (the first film layer), 12 μm thickness of PE film (the second film layer), about 0.9 mm of the thickness of melt-blown nonwoven sheet. The film layer (PET film and PE film) had about 1,240,000 holes/m² of through-micro bores (of average diameter about 100 μm) and 25% area ratio of apertures (aperture diameter was about 7.3 mm). The air permeability of the sheet was 1.2 seconds per 100 cc. The elastic modulus of the PET film was about 2700 Mpa, and that of the PE film was about 6 Mpa. The spectrums 800, 802, 804, 806, 808 and 810 were generated in the same manner to those described with reference to FIG. 5, with the backing airspace as noted in FIG. 8.

Figure 9:
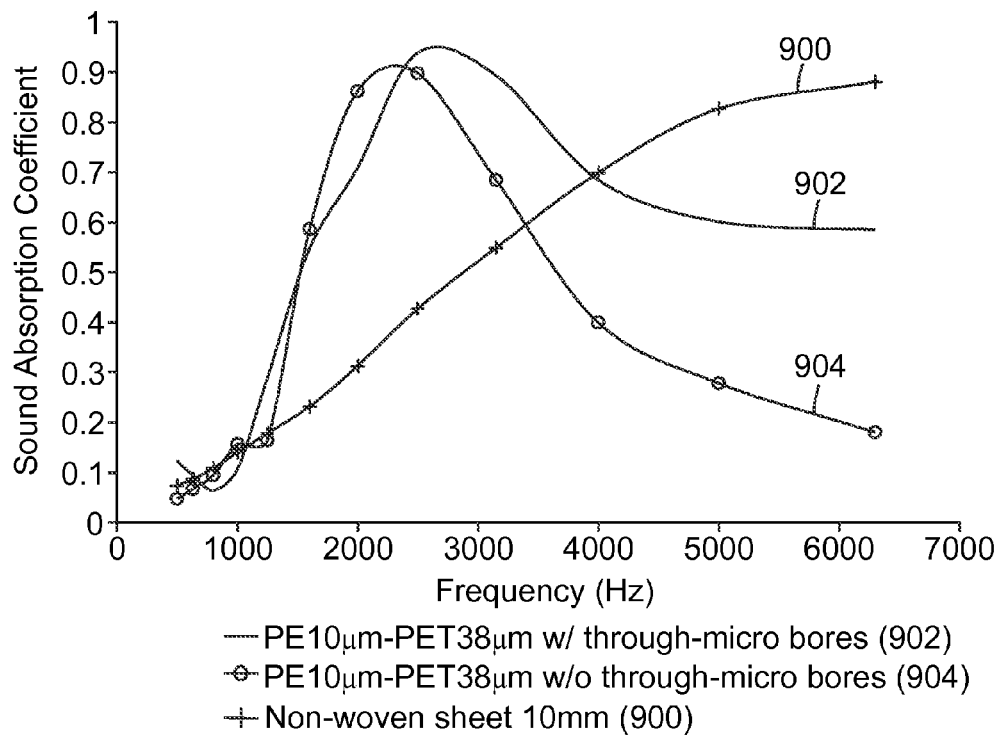
FIG. 9 is a graph of sound absorption of a double film layer with and without through-micro bores.

FIG. 9 is a graph of sound absorption of a double film layer with and without through-micro bores. The spectrum 900 shows a sound absorption coefficient for a melt-blown nonwoven sheet having 10 mm of thickness. The spectrums 902 and 904 show a sound absorption coefficient for a double layered film comprising a 38 μm thick PET film and a 10 μm thick PE film (with no nonwoven present). The elastic modulus of the PET film was about 2700 Mpa, and that of the PE film was about 6 Mpa. The double layered film for the spectrum 902 had about 1,240,000 holes/m² of through-micro bores and no apertures and the film for 904 had no through-micro bores or apertures. The air permeability of the double layered film for 902 was 1.2 seconds per 100 cc and the average diameter of the through-micro bores of the film for 902 was about 100 μm.

The spectrums 900, 902 and 904 were generated in the same manner to those described with reference to FIG. 5.

From the disclosure thus described, it will be obvious that the concepts disclosed herein may be varied in many ways. Such variations are not to be regarded as a departure from the sprit and scope of the disclosure, and all such modifications as would be obvious to one skilled in the art are intended for inclusion within the scope of the following claims.

What is claimed is:

1. A multilayer sound absorbing sheet comprising a film layer comprising through-micro bores and apertures comprising a diameter of at least 1 mm, and a fibrous material layer disposed on the film layer, wherein the through-micro bores comprise a diameter of from about 10 μm to 200 μm.

2. The multilayer sound absorbing sheet according to claim 1, wherein the total thickness of the multilayer sound absorbing sheet is 510 μm to 2500 μm.

3. The multilayer sound absorbing sheet according to claim 1, wherein the film layer is selected from the group consisting of polyethylene film, polyethylene terephthalate film, polybutylene terephthalate film and polypropylene film.

4. The multilayer sound absorbing sheet according to claim 1, wherein the film layer comprises a multilayer film having a first film layer and a second film layer disposed on the first film layer.

5. The multilayer sound absorbing sheet according to claim 4, wherein the first film layer and the second film layer each are from about 10 μm to 250 μm in thickness.

6. The multilayer sound absorbing sheet according to claim 4, wherein the elastic modulus of the first film layer is from about 1000 to 3000 Mpa and the elastic modulus of the second film layer is from about 5 Mpa to 3000 Mpa.

7. The multilayer sound absorbing sheet according to claim 4, wherein the weight per square meters of the first film layer is from about 5 grams to 500 grams and the weight per square meters of the second film layer is from about 5 grams to 500 grams.

8. The multilayer sound absorbing sheet according to claim 4, wherein the first and second layers are respectively selected from the group consisting of polyethylene film, polyethylene terephthalate film, polybutylene terephthalate film and polypropylene film.

9. A method of absorbing sound comprising the steps of:
providing the multilayer sound absorbing sheet of claim 1; and,
positioning the multilayer sound absorbing sheet between an acoustic source and a sound-reflecting surface, with a backing airspace between the multilayer sound absorbing sheet and the sound-reflecting surface.

10. The method of absorbing sound according to claim 9, wherein the backing airspace between the multilayer sound absorbing sheet and the sound-reflecting surface is from about 1 mm to 20 mm in thickness.

11. The method of absorbing sound according to claim 9, wherein the backing airspace between the multilayer sound absorbing sheet and the sound-reflecting surface is from about 1 mm to 10 mm in thickness.

12. The method of absorbing sound according to claim 9, wherein the backing airspace between the multilayer sound absorbing sheet and the sound-reflecting surface is from about 1 mm to 5 mm in thickness.

13. A sound absorber, comprising:
a sound-reflecting surface;
the multilayer sound absorbing sheet of claim 1 disposed near the sound-reflecting surface with a backing airspace between the multilayer sound absorbing sheet and the sound-reflecting surface.

14. The sound absorber of claim 13, wherein the backing airspace between the multilayer sound absorbing sheet and the sound-reflecting surface is from about 1 mm to 20 mm in thickness.

15. The sound absorber of claim 13, wherein the backing airspace between the multilayer sound absorbing sheet and the sound-reflecting surface is from about 1 mm to 10 mm in thickness.

16. The sound absorber of claim 13, wherein the backing airspace between the multilayer sound absorbing sheet and the sound-reflecting surface is from about 1 mm to 5 mm in thickness.

17. The multilayer sound absorbing sheet of claim 1, wherein the film layer is from about 10 μm to 250 μm in thickness.

18. A multilayer sound absorbing sheet comprising a film layer comprising through-micro bores and apertures comprising a diameter of at least 1 mm, and a fibrous material layer disposed on the film layer, wherein the through-micro bores collectively have, in the absence of the apertures, an air permeability of 0.1 seconds per 100 cc to 300 seconds per 100 cc, as measured in accordance with JIS-L-1906, and the apertures have an aperture ratio of 3% to 50%.

19. The multilayer sound absorbing sheet according to claim 18, wherein the through-micro bores comprise a diameter of from about 10 μm to 200 μm.

20. The multilayer sound absorbing sheet according to claim 19, wherein the film layer is from about 10 μm to 500 μm in thickness.

21. The multilayer sound absorbing sheet according to claim 20, wherein the fibrous material layer is from about 500 μm to 2000 μm in thickness.

\* \* \* \* \*